United States Patent [19]
Watson et al.

[11] Patent Number: 5,812,584
[45] Date of Patent: Sep. 22, 1998

[54] ALIGNMENT OF LASER RESONATOR

[75] Inventors: Tom A. Watson, Carlsbad; Peter J. Bailey, Escondido; Philip J. Marusek, Encinitas, all of Calif.

[73] Assignee: Hughes Electronics Corporation, Los Angeles, Calif.

[21] Appl. No.: 689,865

[22] Filed: Aug. 15, 1996

[51] Int. Cl.⁶ .................................................. H01S 3/08
[52] U.S. Cl. ............................... 372/95; 372/99; 372/107
[58] Field of Search ................................. 372/92, 95, 99, 372/107, 109; 359/840, 871, 883

[56] References Cited

U.S. PATENT DOCUMENTS

| | | | |
|---|---|---|---|
| 3,751,140 | 8/1973 | Berlin et al. | 359/840 |
| 3,919,663 | 11/1975 | Caruolo et al. | 372/107 |
| 3,972,600 | 8/1976 | Cobarg | 359/840 |
| 4,144,505 | 3/1979 | Angelbeck et al. | 372/107 |

*Primary Examiner*—John D. Lee
*Attorney, Agent, or Firm*—Terje Gudmestad; Michael W. Sales

[57] ABSTRACT

A method for aligning reflective surfaces in an unstable laser resonator is provided herein. By providing the outwardly facing side of the front mirror of the resonator with a reflective positioning surface (46) having an optical axis (80) coincident with the optical axis (82) of the front mirror (44), alignment procedures are greatly simplified. The alignment method comprises the steps of fabricating a support surface having a support plate (42) and a front reflective surface (44) on its inner surface, the front reflective surface having a primary optical axis (82). A positioning reflective surface (46) is affixed to an outer surface of the support plate, the positioning reflective surface having a secondary optical axis (80) coincident with the primary optical axis. The support plate also has means for securing the support surface to the laser resonator. The method also comprises positioning a laser emitter in a predetermined orientation with the laser resonator and placing a rear reflective surface in a substantially perpendicular orientation to the laser emitter. The laser emitter transmits a laser beam, and the rear reflective surface is aligned such that the laser beam is reflected off the rear reflective surface and back upon itself. The method also comprises securing the support surface to the laser resonator and applying the laser beam from the laser emitter to the positioning reflective surface. Finally, the resonator is adjusted such that the laser beam is reflected off the positioning reflective surface back upon itself, providing alignment of both laser reflective surfaces.

12 Claims, 4 Drawing Sheets

ALIGNMENT OF LASER RESONATOR

BACKGROUND OF THE INVENTION

1. Field of the Invention

This invention relates to gas resonator lasers, and more particularly to alignment of such lasers prior to operation.

2. Description of Related Art

Current laser technology employs an unstable resonator system, providing a pressure vessel containing a spherical concave reflective surface at one side of the energy source and a spherical convex reflective surface facing the spherical concave reflective surface.

The reflector surfaces focus the laser beam generated within the resonator, and exact alignment of the surfaces is critical for optimal laser performance. Lasers having unstable resonators typically require elaborate optical setups and complex fixturing for alignment of the reflective mirrors.

Due to the fact that unstable resonators use non-transparent reflective elements, the elements of the system must be aligned using an external alignment technique. In the past, multiple alignment steps have been necessary to ensure proper operation of the system. Such alignment techniques may take up to several hours to complete, and may require several expensive components to properly align the reflective surfaces.

Further, reflective surfaces and cavity lengths may differ in size, and previous alignment techniques may not accommodate all sized laser devices.

SUMMARY OF THE INVENTION

Accordingly, it is a principal object of the current invention to provide a relatively inexpensive and rapid means for aligning the reflective surfaces of an unstable laser resonator.

It is another object of the current invention to provide such an alignment procedure for various sized laser devices.

Another object is to provide an unstable laser resonator that is inherently easier to align.

According to the present invention, there is provided a method for aligning reflective surfaces in an unstable laser resonator. The method comprises the steps of fabricating a support surface, the support surface having a support plate and a positioning reflective surface having a primary optical axis, where the positioning reflective surface is affixed to an outer surface of the support plate. A front reflective surface is affixed to an inside surface of the support plate, the front reflective surface having a secondary optical axis coexistent with the primary optical axis. The support plate also has means for securing the support surface to the laser resonator. The method also comprises positioning a laser emitter in a predetermined orientation with the laser resonator and placing a rear reflective surface in a substantially perpendicular orientation to the laser emitter. The laser emitter transmits a laser beam, and the rear reflective surface is aligned such that the laser beam is reflected off the first reflective surface and back upon itself and back and forth between the front and rear reflective surfaces.

The method further comprises securing the support surface to the laser resonator and applying the laser beam from the laser emitter to the third reflective surface. Finally, the resonator is adjusted such that the laser beam is reflected off the third reflective surface back upon itself.

In one aspect of the invention there is provided an unstable laser resonator that can be aligned very simply, without elaborate optical set-ups or fixturing.

Other objects, features, and advantages of the present invention will become more apparent from a consideration of the following detailed description and from the accompanying drawings.

BRIEF DESCRIPTIONS OF THE DRAWINGS

DESCRIPTION OF THE PREFERRED EMBODIMENT

Figure 1A:
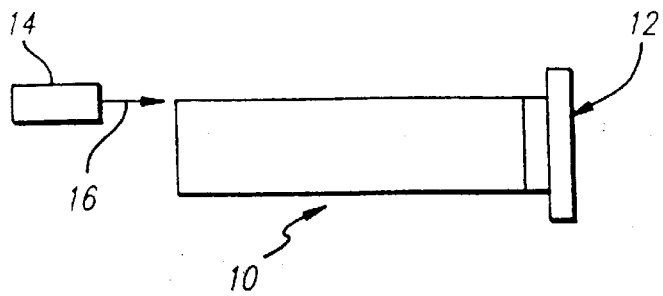
FIGS. 1a–1e show a prior art implementation of the alignment of a laser cavity of an unstable laser resonator.
Figure 1B:
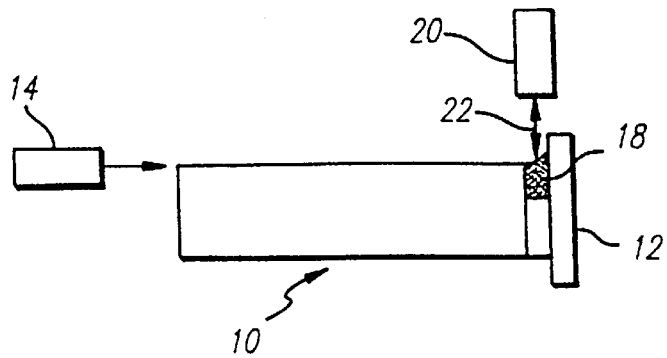
Figure 1C:
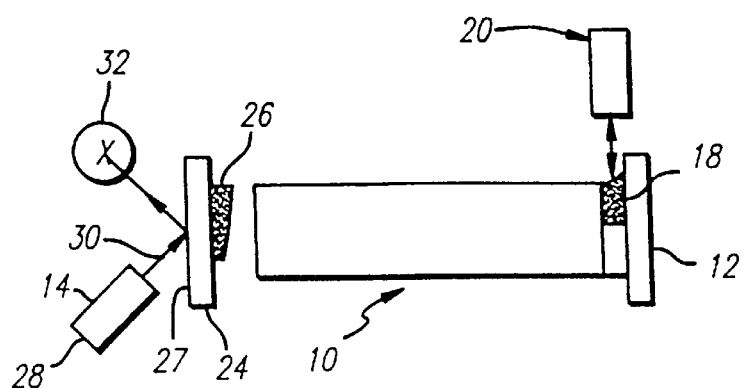
Figure 1D:
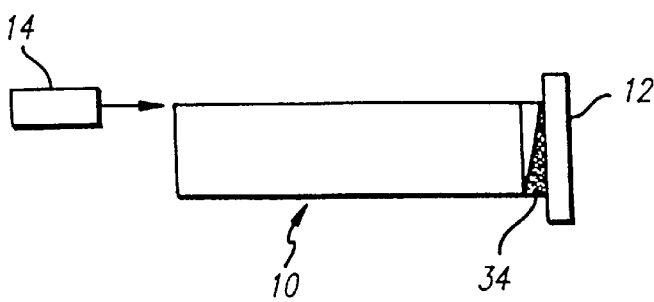
Figure 1E:
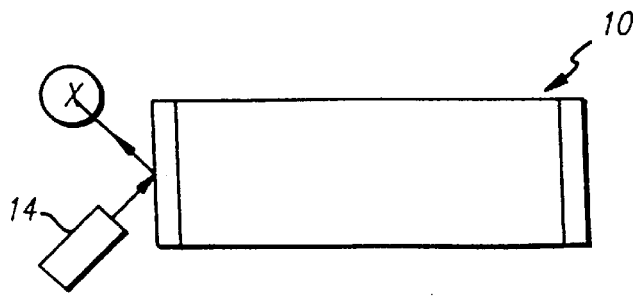

A typical previous method of aligning an unstable laser resonator is shown in FIGS. 1a–1e, which illustrate five successive steps of a prior alignment procedure. Several separate helium-neon alignment lasers are used. The resonator cavity 10 is affixed to bracing plate 12. A first helium-neon alignment laser 14 emits first laser beam 16 into resonator cavity 10. Positioning of the first alignment laser 14 is accomplished within Step 1 FIG. 1a) to align the beam of first alignment laser 14 on the resonator axial axis. This optical axis is defined, for the alignment laser, by two apertures (not shown) in the resonator cavity.

In Step 2 (FIG. 1b), a second helium-neon alignment laser 20 is oriented with its beams substantially perpendicular to the beam of the first helium-neon laser 14. Alignment reflective surface 18 is placed temporarily within the resonator cavity 10 in a position where the rear reflective surface 34 will eventually be positioned. Alignment reflective surface 18 has a flat surface machined thereon and is initially oriented in an approximately 45 degree angle with respect to the axes of both first helium-neon laser 14 and second helium-neon laser 20. The alignment reflective surface 18 is then positioned with respect to bracing plate 12 so that first laser beam 16 from the first alignment laser 14 and second laser beam 22 from second helium-neon laser 20 coincide, each being directed along the resonator laser optical axis. Such an alignment is useful to allow a proper orientation for a proper orientation for front reflective surface 24.

In Step 3 (FIG. 1c), a support plate 24 having a front reflective surface 26 (the resonator front mirror) affixed thereto is initially oriented using second helium-neon alignment laser 20. The front mirror 26 is mounted and aligned so that the retroreflected beam from second alignment laser 20 retraces the original beam from second alignment laser 20. Support plate 24 has a reflective surface 27 bonded to its exterior. The optical axis of surface 27 has no known or defined relation to the optical axis of front reflective surface 27. Such relation is of no consequence in this prior art method. Also in Step 3, after orienting surface 26, a third helium-neon alignment laser 28 is used to effectively record the orientation of surface 26 by reflecting its beam 30 from the surface 27 to a suitable target. The position 32 of the beam reflected from surface 27 is recorded for later use. Once the front reflective surface 26 and support plate 24 are placed in position, the alignment reflective surface and rear reflective surface 34 cannot be accessed, as a laser beam from the outside, such as first helium-neon alignment laser 14, cannot access the resonator cavity 10. The orientation of front reflective surface 26 is maintained such that the reflection of second laser beam 22 from alignment reflective surface 18 produces a reflection from front reflective surface 26 which is coincident with the laser beam 22 transmitted from alignment reflective surface 18. Additionally, third helium-neon alignment laser 28 produces the third laser beam 30 that is reflected from support plate 24 onto a target position 32. Target position 32 is marked for use in Step 5. While not pictured in Step 3 in order to allow a clear view of the other elements, first helium-neon alignment laser 14 is not removed from the setup but remains in the alignment position from Step 2 for use in Step 4.

In Step 4 (FIG. 1d), the support plate 24 is removed and rear reflective surface 34 is placed and secured to bracing plate 12. Final alignment of rear reflective surface 34 is accomplished such that the retroreflection from surface 34 of first laser beam 16 from first helium-neon alignment laser 14 is coincident with the beam transmitted from first alignment laser 14.

Continuing the description of the prior art alignment procedure, in Step 5 (FIG. 1e), support plate 24 and rear reflective surface 34 are remounted and third helium-neon alignment laser 28 directs third laser beam 30 at surface 27. Orient action of support plate 24 is adjusted so that laser beam 30 reflected from surface 27 strikes target 32, indicating alignment of rear reflective surface 34 and front reflective surface 26.

The entire five step process described above may take an extremely long period of time, typically from eight to ten hours. A great deal of fixturing is involved in Steps 2 and 3 of FIGS. 1b and 1c, requiring fixtures to hold parts in position, particularly the rear reflective surface 24 so that second laser beam 22 and third laser beam 30 are oriented properly. However, there is no way of aligning both rear reflective surface 34 and front reflective surface 26. Fixturing, orienting, aligning and realigning are extremely time consuming and tedious steps, which should be kept to a minimum. Further, the method shown in FIGS. 1a–1e is not completely foolproof, since while the target position 32 is established in Step 3, removal and replacement of support plate 24 and front reflective surface 26 may cause a slight reorientation of these components, so that the front reflective surface 26 and rear reflective surface 34 are not in proper exact alignment, even though reflection of third laser beam 30 hits target position 32 in Step 5.

Figure 2A:
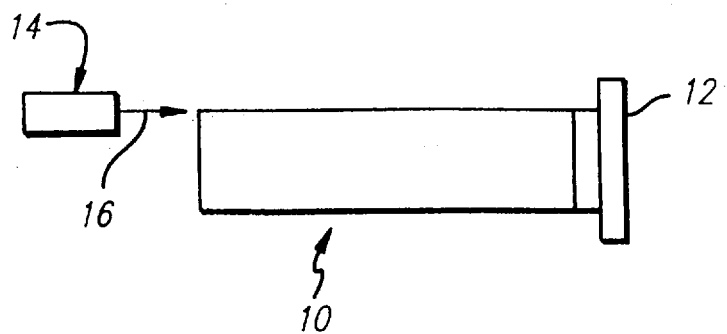
FIGS. 2a–2c illustrate successive steps of the laser cavity alignment procedure according to principles of the present invention.
Figure 2B:
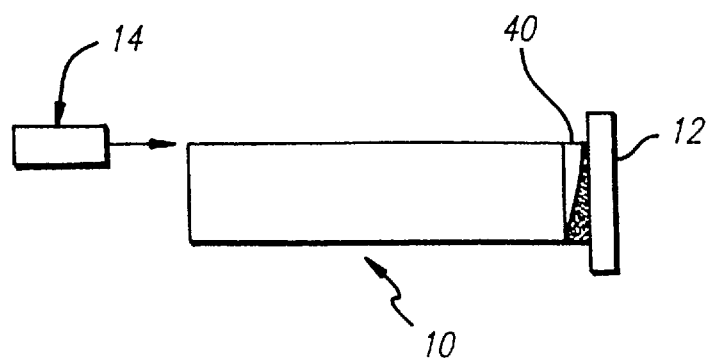
Figure 2C:
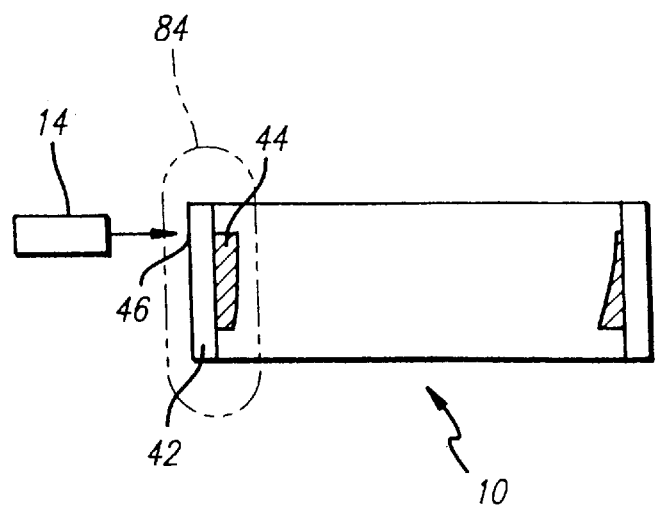

A greatly simplified method according to principles of the present invention is shown in FIGS. 2a–2c and consists of fewer steps than the method shown in FIGS. 1a–1e. The new and simpler method is based on a modification of the resonator laser front mirror. To facilitate and greatly simplify alignment of the unstable resonator laser, the structure of one of the mirrors, preferably the front mirror, is modified to include an alignment reference surface 46 (FIG. 2c). This surface is formed on an outer side of the front mirror structure, facing away from the resonator cavity and has an optical axis coincident with the optical axis of the laser and with the optical axis of the front mirror. The new method of an embodiment of the invention involves orienting first helium-neon alignment laser 14 (FIG. 2a) with respect to resonator cavity 10 and bracing plate 12 such that laser beam 16 is emitted in the direction of the position where first reflective surface 40 will be placed. Beam 16 is projected through two apertures (not shown) which define the optical axis of the resonator laser. This step 1 FIG. 2a) of the new method is the same as step 1 (FIG. 1a) of the old method. However, only one helium-neon alignment laser, first alignment laser 14, is needed in the simplified alignment. This laser remains fixed in the position of step 1 and will not be moved until the alignment procedure is completed. In Step 2 (FIG. 2b), rear reflective surface 40 is oriented such that the laser beam 16 emitted from sole alignment helium-neon laser 14 strikes rear reflective surface 40 and is retroreflected in coincidence with the beam projected from first alignment laser 14 to rear surface 40. Once rear reflective surface 40 is oriented properly, it is not realigned for the remainder of the procedure.

In step 3 (FIG. 2c), the front mirror support plate 42, bearing both the front internally directed mirror 44 and the externally directed alignment reference surface 46 (which have mutually coincident optical axes), is adjusted so that the beam of the first alignment laser 14 is retroreflected from surface 46 in coincidence with the beam projected from the laser 14. Since the beam from first alignment laser 14 is directed along the resonator optical axis and the beam reflected from rear reflective surface 40 is also directed along the resonator optical axis, and since the optical axes of front reflective surface 44 and position reflective surface 46 are coincident with each other and with the beam of first alignment laser 14, both of the front and rear reflector surfaces 44, 40 are properly aligned.

Step 3 (FIG. 2c) shows the unique fabrication of support plate 42 having affixed thereon both front reflective surface 44 and positioning reflective surface 46. The support plate 42, front reflective surface 44, and positioning reflective surface 46 must be fabricated and machined such that the optical axes of the front reflective surface 44 and positioning reflective surface 46 coincide and are substantially perpendicular to support plate 42. One ordinarily skilled in the art of machining parts for use in conjunction with lasers can fabricate such a structure. The orientation and interrelationship of support plate 42, front reflective surface 44, and of positioning reflective surface 46 permit alignment of the front reflective surface 44 without the time consuming fixturing and alignment of Steps 2 and 3 of the prior art method shown in FIG. 1. Effectively, because of this orientation and interrelationships, front surface 44 can be aligned by aligning positioning reflective surface 46.

In Step 3, the support plate 42 is affixed to the resonator cavity 10 while providing reorientation capability of the support plate 42. Once the support plate has been initially affixed to the resonator cavity, first helium-neon alignment laser 14 transmits first laser beam 16 which reflects off positioning reflective surface 46. Note that first alignment laser 14 remains fixed in its position of step 1 and has not been moved. Support plate 42 is then adjusted so that first laser beam 16 retroreflects from surface 46 back upon itself. Once the retroreflection occurs, the support plate 42 is finally secured to resonator cavity 10, thereby providing alignment of the front reflective surface 44 and rear reflective surface 40, because both are now aligned with beam 16, which is still on the resonator optical axis. The helium neon laser verifies the tilt of the mirrored surfaces.

Figure 3:
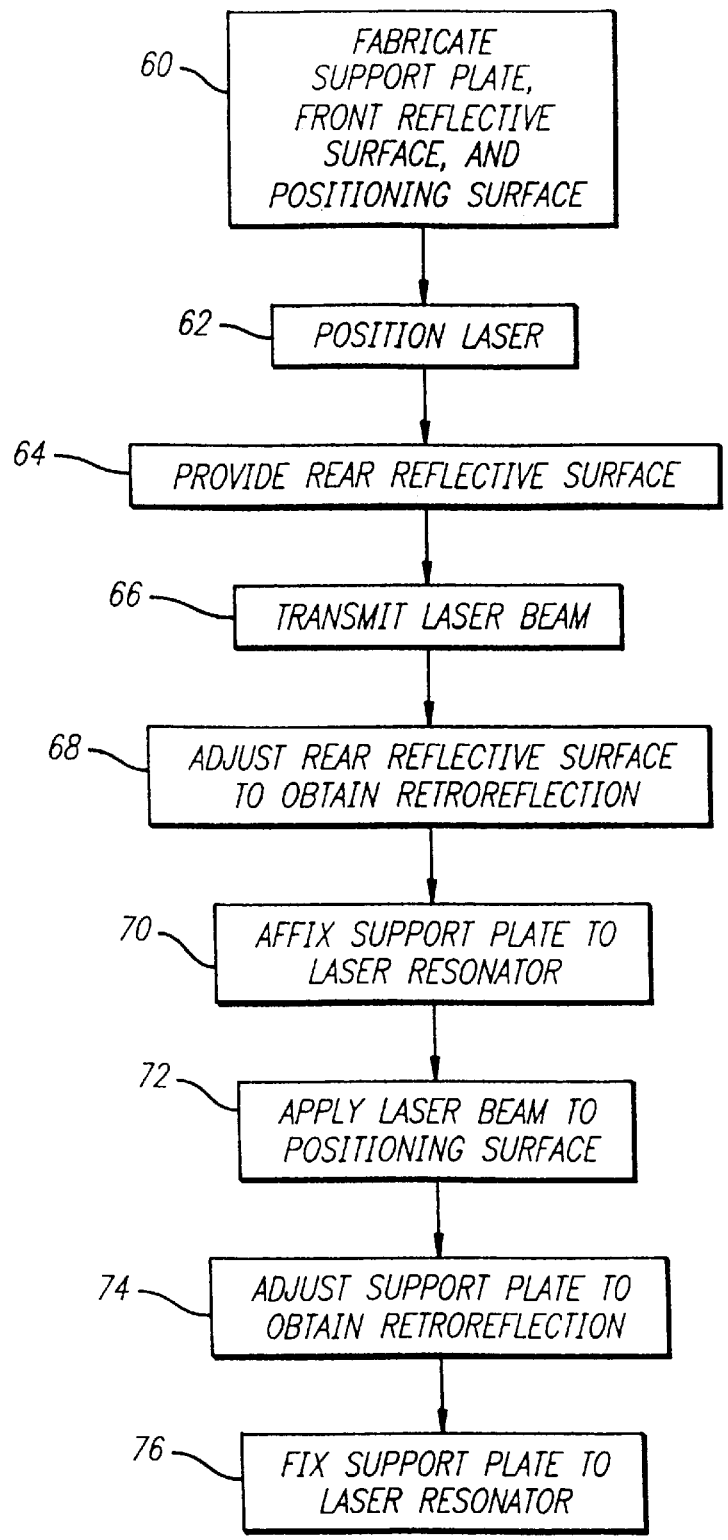
FIG. 3 is a block diagram showing the steps of the current laser cavity alignment procedure of the present invention.

The sequence of steps of the method is illustrated in FIG. 3. First, fabricating step 60 causes the support plate, front reflective surface, and positioning reflective surface to properly interrelate and the reflective surfaces 44 and 46 to have mutually coincident optical axes. Laser positioning step 62 orients the helium-neon laser toward the resonator cavity and along the resonator optical axis. Rear reflective surface positioning step 64 orients the rear reflective surface with respect to the helium-neon laser. Laser beam transmission step 66 causes the helium-neon laser to emit a laser beam toward the rear reflective surface. Rear reflective surface adjustment step 68 positions the rear reflective surface inside the resonator cavity so as to obtain retroreflection, i.e., the helium-neon laser is reflected back upon itself.

Support plate securing step 70 affixes the support plate 42 to the laser resonator. Laser beam application step 72 then applies the laser beam to the positioning surface on the outside of the support plate. The support plate is then adjusted to obtain retroreflection in support plate adjustment step 74. Finally, fixing step 76 causes the support plate to be fixed to the laser resonator cavity, completing alignment of the laser.

Figure 4:
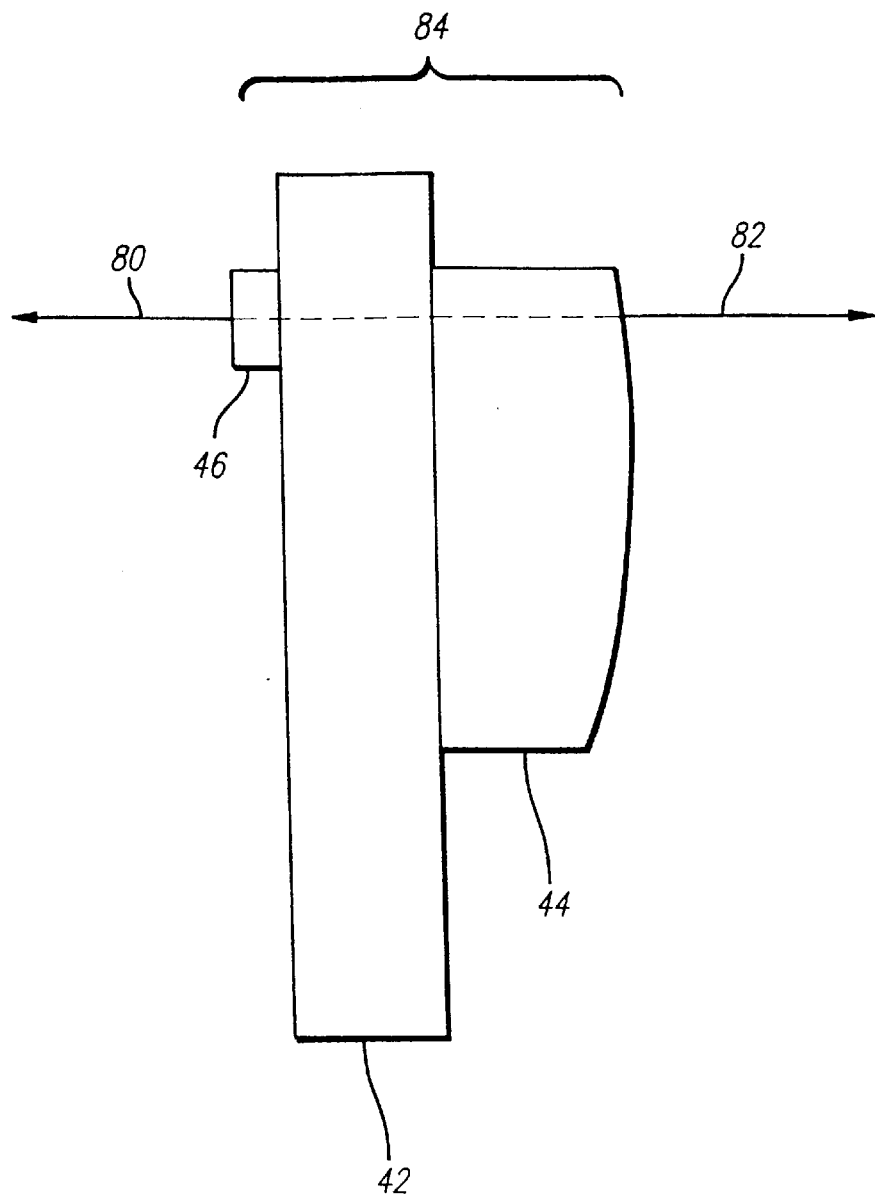
FIG. 4 presents the orientation of the support plate, front reflective surface, and positioning reflective surface of the proposed invention.

As shown in FIG. 4, support plate 42 forms the foundation for both front reflective surface 44 and positioning reflective surface 46, all elements of which make up support surface 84 and are fixedly positioned relative to one another. Both mirrors affixed to support plate 42 are manufactured by single point diamond turning, a common mirror fashioning technique. The entire support surface 84 is available from Kugler GMBH of Salem, Germany. Front reflective surface 44 is convex and spherical in its cross section, and has primary optical axis 82 oriented substantially perpendicular to support plate 42. Positioning reflective surface 46 has an optical axis 80 oriented substantially perpendicular to support plate 42 and coincident with primary optical axis 82, and is diamond machined to be flat. Coincidence of axes 80 and 82 is accomplished in the manufacture. Orientation of the positioning reflective surface 46 such that the first laser beam 16 from first helium-neon alignment laser 14 is reflected back upon itself provides that front reflective surface 44 and rear reflective surface 40 are in alignment.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method for aligning relfective surfaces in a laser resonator comprising the steps of:
    fabricating a support surface, comprising the steps of:
    constructing a support member;
    affixing to an inside surface of said support member a front reflective surface having a primary optical axis;
    affixing to an outside surface of said support member a positioning reflective surface having a secondary optical axis coincident with said primary optical axis;
    positioning an alignment laser in a predetermined orientation with respect to the laser resonator;
    placing a rear reflective surface in the laser resonator in a substantially perpendicular orientation to the alignment laser;
    transmitting a laser beam from said alignment laser to said rear reflective surface;
    aligning said rear reflective surface such that said laser beam is reflected off said rear reflective surface back upon itself;
    securing said support member to said laser resonator;
    applying said laser beam from said alignment laser to said positioning reflective surface; and
    adjusting said support member such that said laser beam is reflected off said positioning reflective surface back upon itself.

2. The method for aligning reflective surfaces in a laser resonator of claim 1, further comprising the step of finally securing said support member to said laser resonator after said adjusting step.

3. A method for aligning reflective surfaces in a laser resonator comprising the steps of:
    fabricating a support surface having a front reflective surface on an inner surface thereof and a positioning reflective surface on an outer surface thereof, said front and positioning reflective surfaces having mutually coincident primary and secondary optical axes;
    positioning an alignment laser in a predetermined orientation with the laser resonator;
    placing a rear reflective surface in a substantially perpendicular orientation to the alignment laser;
    aligning said rear reflective surface such that a laser beam transmitted from said alignment laser is reflected off said rear reflective surface back upon itself;
    securing said support surface to said laser resonator;
    applying the laser beam from said alignment laser to said positioning reflective surface; and
    adjusting said support surface such that said laser beam is reflected off said positioning reflective surface back upon itself.

4. A method for aligning reflective surfaces in a laser resonator comprising the steps of:
    fabricating a laser support apparatus having oppositely facing reflective surfaces that have mutually aligned optical axes;
    orienting a rear reflective surface in a predetermined angular position utilizing an alignment technique;
    attaching said laser support apparatus to the laser resonator; and
    arranging said laser support apparatus using the alignment technique.

5. The method for aligning reflective surface in a laser resonator of claim 4, wherein said fabricating step comprises fashioning a support surface having a front reflective surface on an inner surface of said support surface and a positioning reflective surface on an outer surface of said support surface, wherein said front reflective surface and said positioning reflective surface have coincident optical axes.

6. The method of claim 5 wherein said coincident optical axes consist of a primary axis substantially perpendicular to said outer surface of said support surface and a secondary axis substantially perpendicular to said inner surface of said support surface, wherein said primary axis and said secondary axis are angularly and positionally coincident.

7. The method for aligning reflective surfaces in a laser resonator of claim 4, wherein said alignment technique consists of transmitting a first laser beam toward a reflective surface and adjusting said reflective surface such that said first laser beam reflects back upon itself.

8. In combination:
    a laser resonator; and
    a support surface for aligning reflective surfaces in the laser resonator;
    the support surface comprising:
    a support plate;
    a front reflective surface affixed to an inside surface of said support plate, said front reflective surface having a primary optical axis; and a positioning reflective surface affixed to an outside surface of said support plate, said positioning reflective surface having a secondary optical axis coincident with said primary optical axis.

9. The combination of claim 8, wherein said positioning reflective surface is substantially flat.

10. The combination of claim 9, wherein said front reflective surface is a cross section of a sphere.

11. In an unstable resonator laser having a non-transparent front reflective mirror and a non-transparent rear reflective mirror mounted in a resonator housing that defines a resonator cavity and having mutually facing front and rear inner reflective surfaces for reflecting energy between them along the optical axis of the laser, said inner reflective surfaces each having an optical axis that coincides with the optical axis of the laser, the improvement comprising:

an alignment reference surface for facilitating alignment of said mirrors, said alignment reference surface comprising a reflective optical reference surface on an outer side of one of said non-transparent reflective mirrors, said reflective optical reference surface facing away from said resonator cavity and having an optical axis coincident with the optical axis of said laser.

12. The laser of claim 11 wherein said front reflective mirror is concave and said rear reflective mirror is convex.

* * * * *